E. E. LA ROSE.
RESILIENT WHEEL STRUCTURE.
APPLICATION FILED FEB. 19, 1919.
1,335,443.
Patented Mar. 30, 1920.
3 SHEETS—SHEET 1.
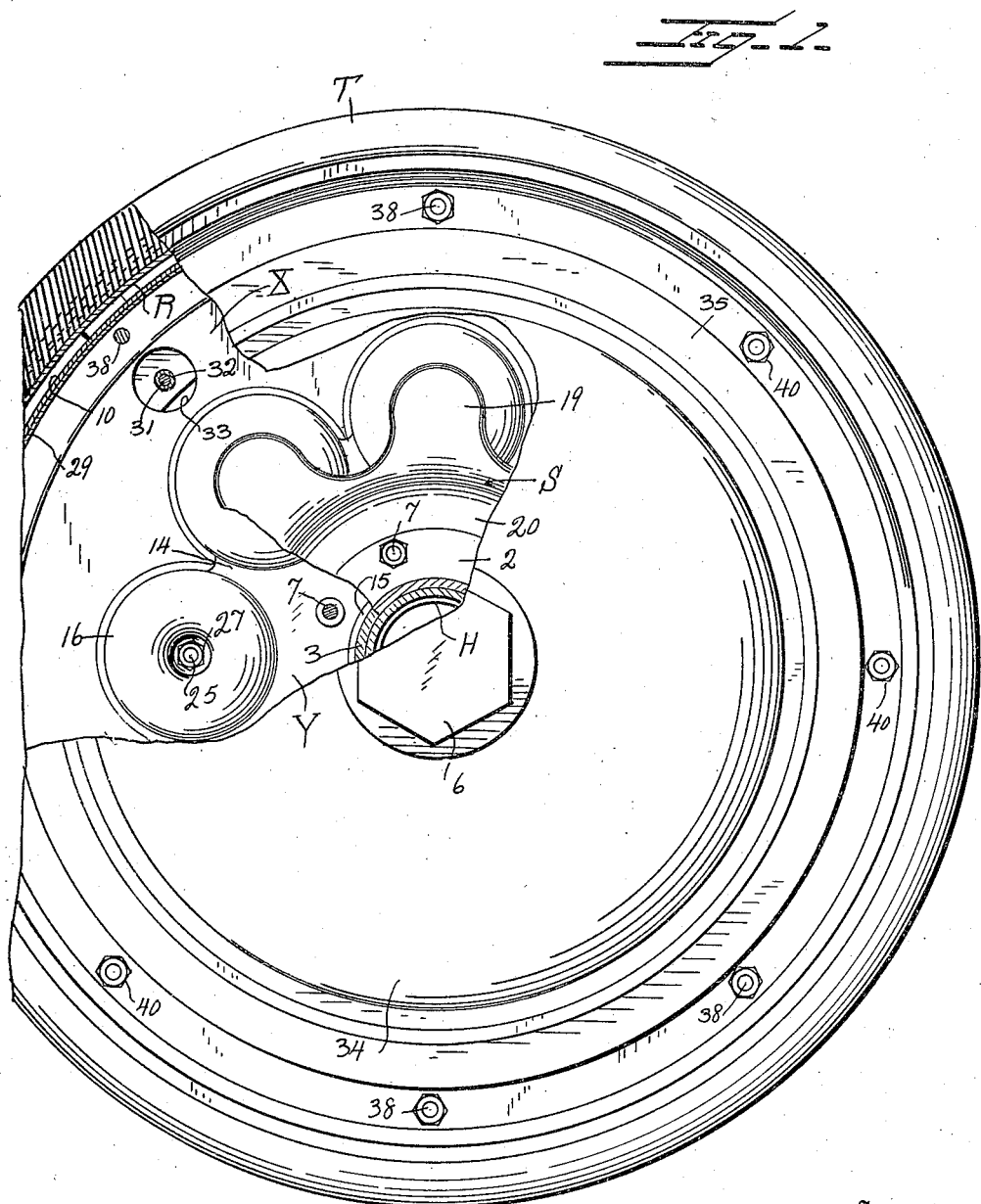
Inventor
E.E.LaRose
By Watson E. Coleman
Attorney

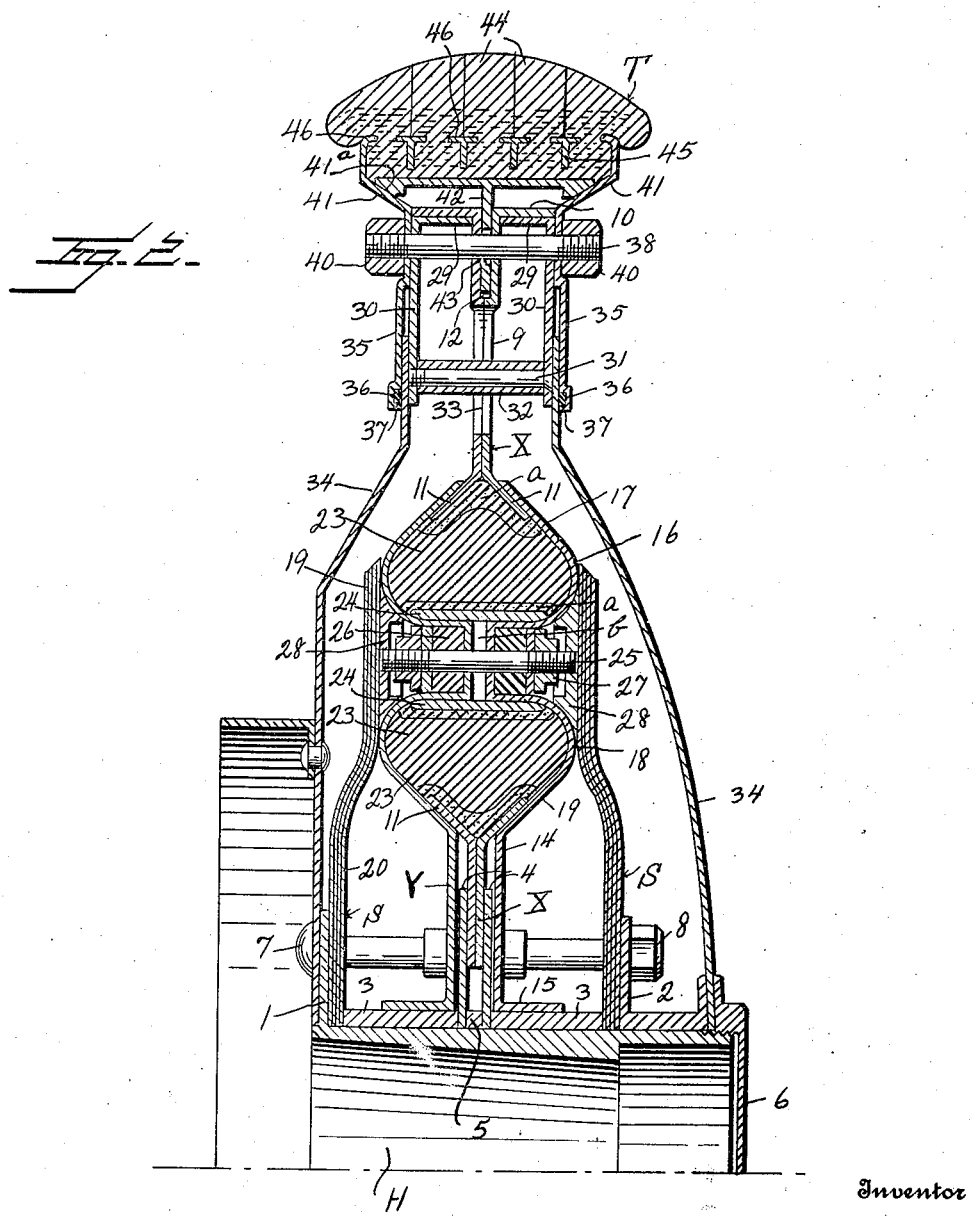

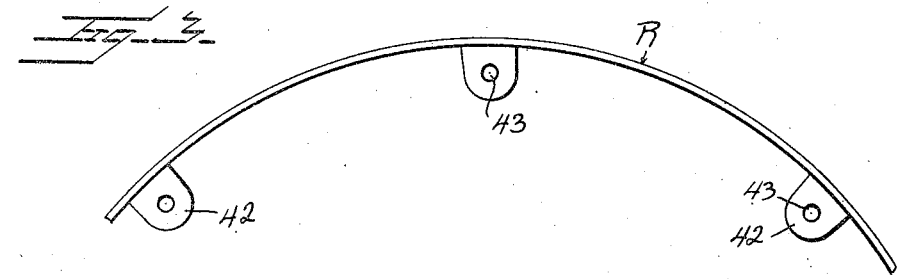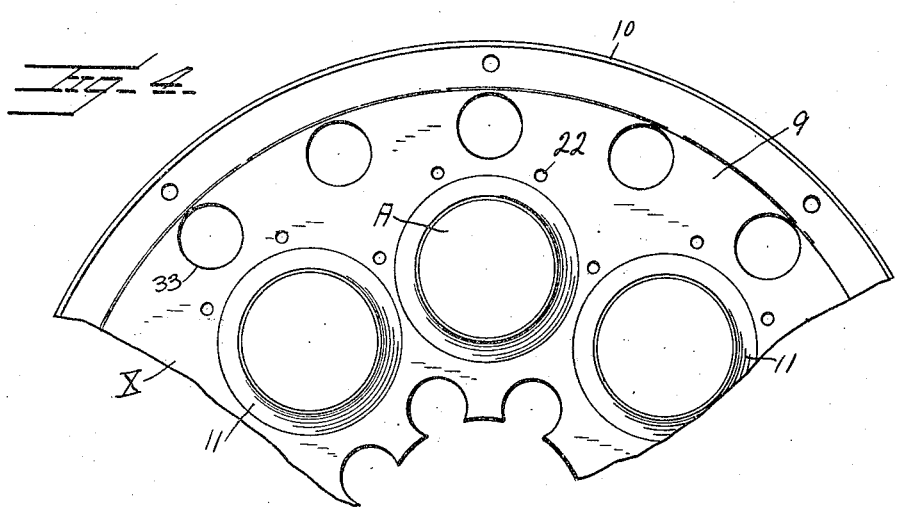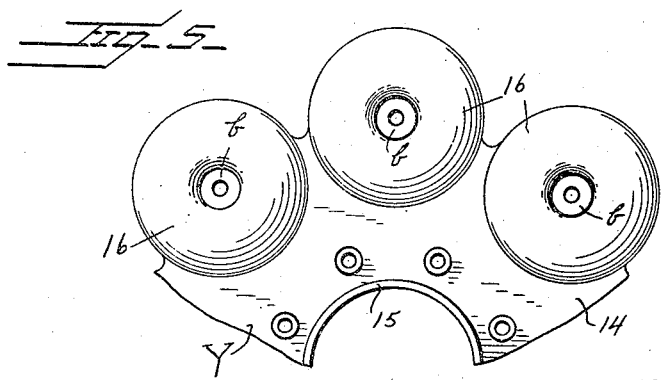

UNITED STATES PATENT OFFICE.

EUGENE E. LA ROSE, OF PROVIDENCE, RHODE ISLAND, ASSIGNOR OF ONE-HALF TO JOHN J. McCABE, OF GLENS FALLS, NEW YORK.

RESILIENT WHEEL STRUCTURE.

1,335,443.   Specification of Letters Patent.   Patented Mar. 30, 1920.

Application filed February 19, 1919. Serial No. 277,928.

*To all whom it may concern:*

Be it known that I, EUGENE E. LA ROSE, a citizen of the United States, residing at Providence, in the county of Providence and State of Rhode Island, have invented certain new and useful Improvements in Resilient Wheel Structures, of which the following is a specification, reference being had to the accompanying drawings.

This invention relates to certain improvements in resilient wheel structures, and it is an object of the invention to provide a structure of this general character having novel and improved means whereby the shocks and jars incident to travel are substantially eliminated.

It is also an object of the invention to provide a novel and improved structure of this general character which affords the same resiliency obtained with the use of a pneumatic tire and wherein side sway or wabbling of the structure is avoided such as occurs in connection with the use of a pneumatic tire when such tire is deflated or under inflated.

An additional object of the invention is to provide a novel and improved structure of this general character including a floating member with which the tire is directly engaged together with a cushioning or shock absorbing agency connecting with said floating member and operating to normally maintain the floating member in a neutral position or in a position substantially concentric to the hub of the structure.

Another object of the invention is to provide a novel and improved structure of a disk type and wherein a resilient or cushioning agency is interposed between the hub and the rim of the structure so that the road shocks will be partly or wholly eliminated from the hub and will not be transmitted to the axle or the chassis.

A still further object of the invention is to provide a novel and improved structure of this general character which permits a drive that is not rigidly connected to the driven rim or tread, but wherein the driving and driven members are flexibly connected in order to substantially absorb the road shocks to prevent materially the transfer of such shocks to the transmission and the motor.

The invention also contemplates as an object to provide a novel and improved tire of a solid construction which will be simple in its construction, and which will be easily mounted or dismounted and whereby any damage to the tire can be readily and conveniently repaired at a small cost, and wherein said tire is constructed in sections so that a part or a fraction of a part of the tire may be removed and replaced.

The invention consists in the details of construction and in the combination and arrangement of the several parts of my improved resilient wheel structure whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in side elevation and partly in section of a resilient wheel constructed in accordance with an embodiment of my invention;

Fig. 2 is an enlarged fragmentary sectional view taken radially through the wheel as disclosed in Fig. 1;

Fig. 3 is a view in side elevation of a rim section as herein employed;

Fig. 4 is a fragmentary view in side elevation of one of the plates comprised in the outer section of the floating member;

Fig. 5 is a fragmentary view in side elevation of one of the plates of the inner section.

As disclosed in the accompanying drawings, H denotes the hub of a wheel structure and which is provided at one end portion with the permanent outstanding annular flange 1 and which has disposed around its opposite end portion the outstanding removable flange 2. Disposed circumferentially around the hub H is a pair of sleeves 3, and engaged between the outer edge of each of the sleeves and the adjacent flanges 1 or 2 is the lower end portion of an annular laminated spring S. Arranged between the sleeves 3 is a pair of spaced flanges 4 and said flanges are maintained in their separated relation by the interposed bushing 5 surrounding the hub H. The sleeves 3, the flanges 4, and the springs S are held in applied position through the medium of the cap nut 6 engaged with the outer end of the hub H or that portion of the hub adjacent to the flange 2. The springs S are further held in operative position by the bolts 7 disposed through the flanges 1 and 2 and also through the flanges 4, and coacting with the outer end portion of each of said bolts is a clamping nut 8.

X denotes a rim member comprising two substantially duplicate annular plates 9 in overlying relation. Each of the plates 9 has its outer marginal portion defined by an outwardly and laterally directed flange 10 and with its inner marginal portion snugly fitting between the flanges 4. The peripheral portions of the plates 9 are offset outwardly to afford therebetween a recess or chamber 12 for a purpose to be hereinafter more particularly referred to.

Each of the plates 9 is provided with an annular series of openings A and each of these openings is defined by an outwardly disposed and inwardly inclined flange 11.

Y denotes a hub member comprising two spaced annular plates 14 having their marginal portions provided with the inwardly facing cups or sockets 16 which receive the flanges 11. The flanges 11 are substantially in constant contact with the peripheral portions 17 of the cups or sockets 16 as is particularly illustrated in Fig. 2. The central portion of each of the cups or sockets 16 is depressed as at $b$ which affords an annular chamber 18. Snugly fitting within each of the chambers 18 is a cushioning agency 23 which preferably comprises a filler of rubber. The inner and outer faces of each of the fillers 23, as indicated at $a$, are preferably of a density greater than the body of said filler in order to resist the wear thereon. It has also been found desirable to surround the base portion of each of the chambers with a plate 24 which prevents the cushioning agency or filler 23 therein from rolling or pinching between the plates 14 or more particularly the depressed portions $b$.

As is clearly illustrated in Fig. 2, the inner marginal portion of each of the plates 14 is defined by an outstanding flange 15 contacting with the sleeves 3 so that the cushioning agencies or fillers 23 serve to normally maintain the members X and Y in their neutral or substantially concentric relation. It is also to be understood that initially each cushioning agency or filler 23 will be of a size in excess of the chamber 18 in which the same is to be arranged so that when the agency or filler 23 is applied within the chamber said agency or filler will be placed under compression to support a specified load without permitting the rim member X to be displaced from its neutral or normal position.

The portions $b$ of the plates 14 are arranged in substantially transversely alined pairs and directed through each of said pairs is a stud or bolt 25. This bolt or stud 25 is also directed through the cushions 26, preferably of rubber positioned outwardly of the plates 14. The cushions 26 serve as stops to yieldingly control the extreme action of the plates 14 of the hub member Y and this functioning of the stops is controlled by the nuts 27 threaded upon each of the bolts 25 outwardly of the cushions or strips 26.

Fitting within the outer extremities of the depressed portions $b$ are the bearing members 28 with which contact the radial extensions 19 of the spring S. The bearing members 28 afford increased bearing surface for the extensions 19 to facilitate the action of the springs S in urging the plates 14 of the hub member Y one toward the other. In the present embodiment of my invention each of the springs S is laminated, and each of the laminations 20 comprises an annular portion snugly surrounding the hub H.

Underlying each of the flanges 10 is an inwardly directed annular flange 29 carried by an annular member 30 arranged at either side of the plates 9 of the rim member X. The inner marginal portions of the plates 30 are connected by the circumferentially spaced bolts 31 and surrounding each of said bolts and snugly fitting between the members 30 are the sleeves or bushings 32 which serve to maintain said members 30 in the desired spaced relation. The bolts 31 and the sleeves 32 also are disposed through the openings 33 formed in the plates 9, and which openings are of such size as to permit the desired movement of the rim member X.

Overlying the inner marginal portion of each of the members 30 is the outer marginal portion of a disk 34. The central portions of each of these disks 34 are suitably secured to the hub H with one of said disks affixed to the flange 1 and the central portion of the second or outer disk clamped between the removable flange 2 and the hub cap 6.

Overlying the members 30 are the clencher members 35 which also overlie the peripheral portions of the disks 34. The inner marginal portion of each of the clencher members 35 is provided with an inwardly facing annular groove 36 in which is seated a gasket 37 of compressible material so that the passage of dust or the like between the disks 34 is prevented.

The clencher members 35 are secured to the members 30 and to the plates 9 by the transversely disposed bolts 38 having engaged with the opposite end portions the clamping nuts 40 whereby the clencher members are anchored to the floating member F.

The outer portions of the clencher members 35 are provided with the inclined or wedge portions 41 with which engage the inclined faces or wedges 41$^a$ carried by the marginal portions of the arcuate rim sections R. Each of the sections R at its transverse center is provided with the inwardly directed ears 42 which are snugly accommodated within the recess or chamber 12 of the rim member X and the openings 43 in the ears 42 through which the bolts 38 are directed are of greater diameters than the maximum diameters of said bolts so that the tread section R may have limited independent radial movement. As the clencher members 35 are forced inwardly the coacting inclined faces or wedges 41 and 42 will cause the sectional rim to move outwardly whereby the clamping of the tire T is facilitated.

Disposed circumferentially around the rim sections R is a plurality of transversely arranged sections 44 of the tire T so that a section or a part of a section 44 may be readily removed and replaced as the occasions of practice may require, and said sections have interposed therebetween and interlocking therewith the clencher rings 45 preferably T shape in cross section. It is preferred that the sections 44 each comprise a plurality of lengths. The opposed faces of the sections 44 of the tire T have molded therein the recesses 46 to receive the clencher rings 45 while the tread portion thereof is a suitable composition vulcanized to the base portion. The side faces of the tire T in its entirety also have molded therein the recesses 46 to receive the inturned marginal portions of the clencher members 35 and the assembly of the sections 44 of the tire T is maintained by the clamping action of the clencher members 35.

The coaction between the flanges 11 and the cups or sockets 16 results in an effective driving connection between the members X and Y but readily permits the desired relative movement of said members in order to compensate for the shocks and jars incident to travel.

The plates 9 are provided with openings 22 and the openings 22 of one plate 9 are adapted to register with the similar openings of the second plate in assembling the wheel, and at which time suitable holding screws or the like (not shown) are engaged through said openings until the wheel structure is completely assembled and after which these bolts or the like are removed. These bolts or the like are of particular advantage in effecting and maintaining the initial compression of the cushioning agencies or fillers 23 in assembling the wheel structure.

From the foregoing description, it is thought to be obvious that a resilient wheel constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A wheel structure comprising a hub, a rim, an annular member engaged with the rim and positioned between the rim and hub, a second annular member surrounding the hub and contacting therewith and comprising separable plates between which the inner portion of the first member extends, the peripheral portion of the plates of the second member being provided with inwardly facing annular chambers, the portion of the first named member between the plates of the second member being provided with openings defined by outstanding flanges engaging the walls of the chambers of the plates, and a cushioning agency snugly engaged within the chambers and bearing against the flanges of the first section.

2. A wheel structure comprising a hub, a rim, an annular member engaged with the rim and positioned between the rim and hub, a second annular member surrounding the hub and contacting therewith and comprising separable plates between which the inner portion of the first member extends, the peripheral portion of the plates of the second member being provided with inwardly facing annular chambers, the portion of the first named member between the plates of the second member being provided with openings defined by outstanding flanges engaging the walls of the chambers of the plates, and a cushioning agency snugly engaged within the chambers and bearing against the flanges of the first section, spaced flanges carried by the hub and between which the inner marginal portion of the first member extends.

3. A wheel structure comprising a hub, a rim, an annular member engaged with the rim and positioned between the rim and hub, a second annular member surrounding the hub and contacting therewith and comprising separable plates between which the inner portion of the first member extends, the peripheral portion of the plates of the second member being provided with inwardly facing annular chambers, the portion of the first named member between the plates of the second member being provided with openings defined by outstanding flanges engaging the walls of the chambers of the plates, a cushioning agency snugly engaged within the chambers and bearing against the flanges of the first section, and means constantly urging the plates of the second member one toward the other.

4. A wheel structure comprising a hub, a rim, an annular member engaged with the rim and positioned between the rim and hub, a second annular member surrounding the hub and contacting therewith and comprising separable plates between which the inner portion of the first member extends, the peripheral portion of the plates of the second member being provided with inwardly facing annular chambers, the portion of the first named member between the plates of the second member being provided with openings defined by outstanding flanges engaging the walls of the chambers of the plates, a cushioning agency snugly engaged within the chambers and bearing against the flanges of the first section, and springs carried by the hub and contacting with the plates of the second member for urging said plates one toward the other.

5. A wheel structure comprising a hub, a rim, an annular member engaged with the rim and positioned between the rim and hub, a second annular member surrounding the hub and contacting therewith and comprising separable plates between which the inner portion of the first member extends, the peripheral portion of the plates of the second member being provided with inwardly facing annular chambers, the portion of the first named member between the plates of the second member being provided with openings defined by outstanding flanges engaging the walls of the chambers of the plates, a cushioning agency snugly engaged within the chambers and bearing against the flanges of the first section, and means carried by the plates of the second section for limiting the relative lateral movement thereof.

6. A wheel structure comprising a hub, a rim, an annular member engaged with the rim and positioned between the rim and the hub, a second annular member surrounding the hub and contacting therewith and comprising separable plates between which the inner portion of the first member extends, the peripheral portion of the plates of the second member being provided with inwardly facing annular chambers, the portion of the first named member between the plates of the second member being provided with openings defined by outstanding flanges engaging the walls of the chambers of the plates, a cushioning agency snugly engaged within the chambers and bearing against the flanges of the first section, and yielding means carried by the plates of the second section for limiting the relative lateral movement thereof.

7. A wheel structure comprising a hub, a rim, an annular member engaged with the rim and positioned between the rim and hub, a second annular member surrounding the hub and contacting therewith and comprising separable plates between which the inner portion of the first named member extends, the peripheral portion of the plates of the second member being provided with inwardly facing annular chambers, the portion of the first named member between the plates of the second member being provided with openings defined by outstanding flanges engaging the walls of the chambers of the plates, a cushioning agency snugly engaged within the chambers and bearing against the flanges of the first section, bolts disposed through the plates of the second section and terminating outwardly thereof, adjustable stops engaged with the extremities of the bolts, and cushioning members interposed between the bolts and the plates.

8. A wheel structure comprising a hub, a rim, an annular member engaged with the rim and positioned between the rim and hub, a second annular member surrounding the hub and contacting therewith and comprising separable plates between which the inner portion of the first member extends, the peripheral portion of the plates of the second member being provided with inwardly facing annular chambers, the portion of the first named member between the plates of the second member being provided with openings defined by outstanding flanges engaging the walls of the chambers of the plates, a cushioning agency snugly engaged within the chambers and bearing against the flanges of the first section, and resilient means carried by the hub at opposite sides of the second member and contacting with the plates thereof for forcing said plates one toward the other.

9. A rim structure comprising a hub, a pair of plates surrounding said hub and having movement longitudinally thereof, a rim, an annular member arranged inwardly of and engaged with the rim, a cushioning agency interposed between the annular member and the plates, and means for constantly urging said plates one to the other.

10. A rim structure comprising a hub, a pair of plates surrounding said hub and having movement longitudinally thereof, a rim, an annular member arranged inwardly of and engaged with the rim, a cushioning agency interposed between the annular member and the plates, and means for constantly urging said plates one to the other, said last named means operating independently of the cushioning agency.

11. A rim structure comprising a hub, a pair of plates surrounding said hub and having movement longitudinally thereof, a rim, an annular member arranged inwardly of and engaged with the rim, a cushioning agency interposed between the annular member and the plates, and means for constantly urging said plates one to the other, said means being adjustable.

In testimony whereof I hereunto affix my signature in the presence of two witnesses.

EUGENE E. LA ROSE.

Witnesses:
ERNEST C. BAKER,
EMMA E. LA ROSE.